United States Patent
Verde et al.

(10) Patent No.: US 9,519,478 B2
(45) Date of Patent: Dec. 13, 2016

(54) SESSION MANAGEMENT IN A MIXED MODE ENVIRONMENT

(71) Applicant: PAYPAL, INC., San Jose, CA (US)

(72) Inventors: Bret Verde, Austin, TX (US); John Nutting, Austin, TX (US); Rick Hogge, Liberty Hill, TX (US)

(73) Assignee: PayPal, Inc., San Jose, CA (US)

( * ) Notice: Subject to any disclaimer, the term of this patent is extended or adjusted under 35 U.S.C. 154(b) by 162 days.

(21) Appl. No.: 14/516,376

(22) Filed: Oct. 16, 2014

(65) Prior Publication Data

US 2016/0110188 A1  Apr. 21, 2016

(51) Int. Cl.

| G06F 9/44 | (2006.01) |
|---|---|
| G06F 11/20 | (2006.01) |
| H04L 12/26 | (2006.01) |
| G06Q 20/08 | (2012.01) |
| G06Q 20/12 | (2012.01) |
| H04L 29/06 | (2006.01) |
| H04L 29/08 | (2006.01) |

(52) U.S. Cl.
CPC .................. *G06F 8/71* (2013.01); *G06F 11/20* (2013.01); *G06F 11/2007* (2013.01); *G06Q 20/085* (2013.01); *G06Q 20/12* (2013.01); *H04L 43/0823* (2013.01); *H04L 65/1069* (2013.01); *H04L 67/1004* (2013.01); *G06F 2201/85* (2013.01)

(58) Field of Classification Search
CPC .. H04L 67/02; H04L 67/2814; H04L 67/2842; H04L 63/0281; H04L 67/10; H04L 67/28
See application file for complete search history.

(56) References Cited

U.S. PATENT DOCUMENTS

| 7,571,208 B2* | 8/2009 | Syed ...................... H04L 67/02 709/203 |
|---|---|---|
| 8,166,460 B2* | 4/2012 | Jindal .................... H04L 67/02 709/236 |
| 2004/0236799 A1* | 11/2004 | Apte ................ G06F 17/30876 |
| 2014/0237109 A1* | 8/2014 | Tiger ................... H04L 67/025 709/224 |
| 2015/0012584 A1* | 1/2015 | Lo ....................... H04L 67/2814 709/203 |
| 2015/0095503 A1* | 4/2015 | Lim ...................... H04L 67/141 709/227 |
| 2015/0169386 A1* | 6/2015 | Gopalraj ................. G06F 9/541 719/328 |

* cited by examiner

*Primary Examiner* — Peling Shaw

(74) *Attorney, Agent, or Firm* — Haynes and Boone, LLP

(57) ABSTRACT

Systems and methods for managing multiple versions of applications executing on servers in a server pool are provided. A request to generate new session data for a transaction requested by a user is received by a first server executing a first version of an application. A determination is made that the first version of the application is unsuitable to process the request. An identity of a second server executing a second version of the application is requested by the first server in a server pool comprising one or more servers, and an appropriate second server is selected. The first server transmits a hypertext transfer protocol proxy request to the selected second server, which generates the new session data.

20 Claims, 5 Drawing Sheets

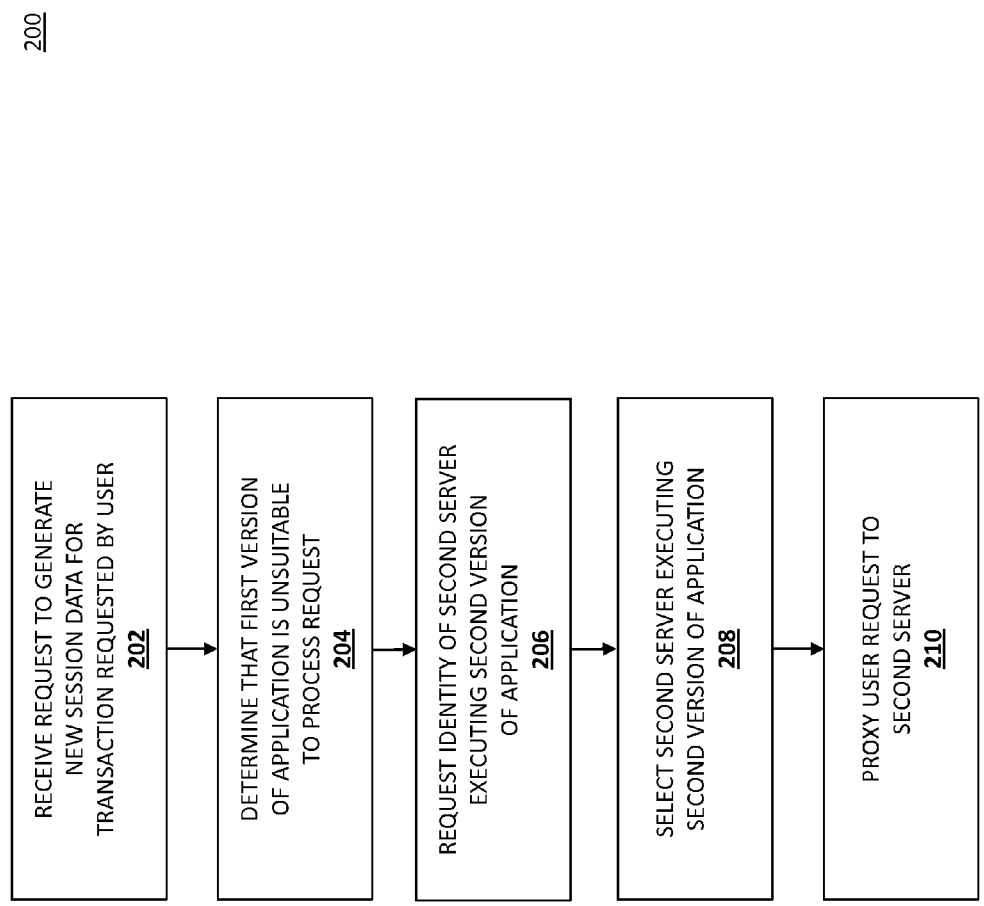

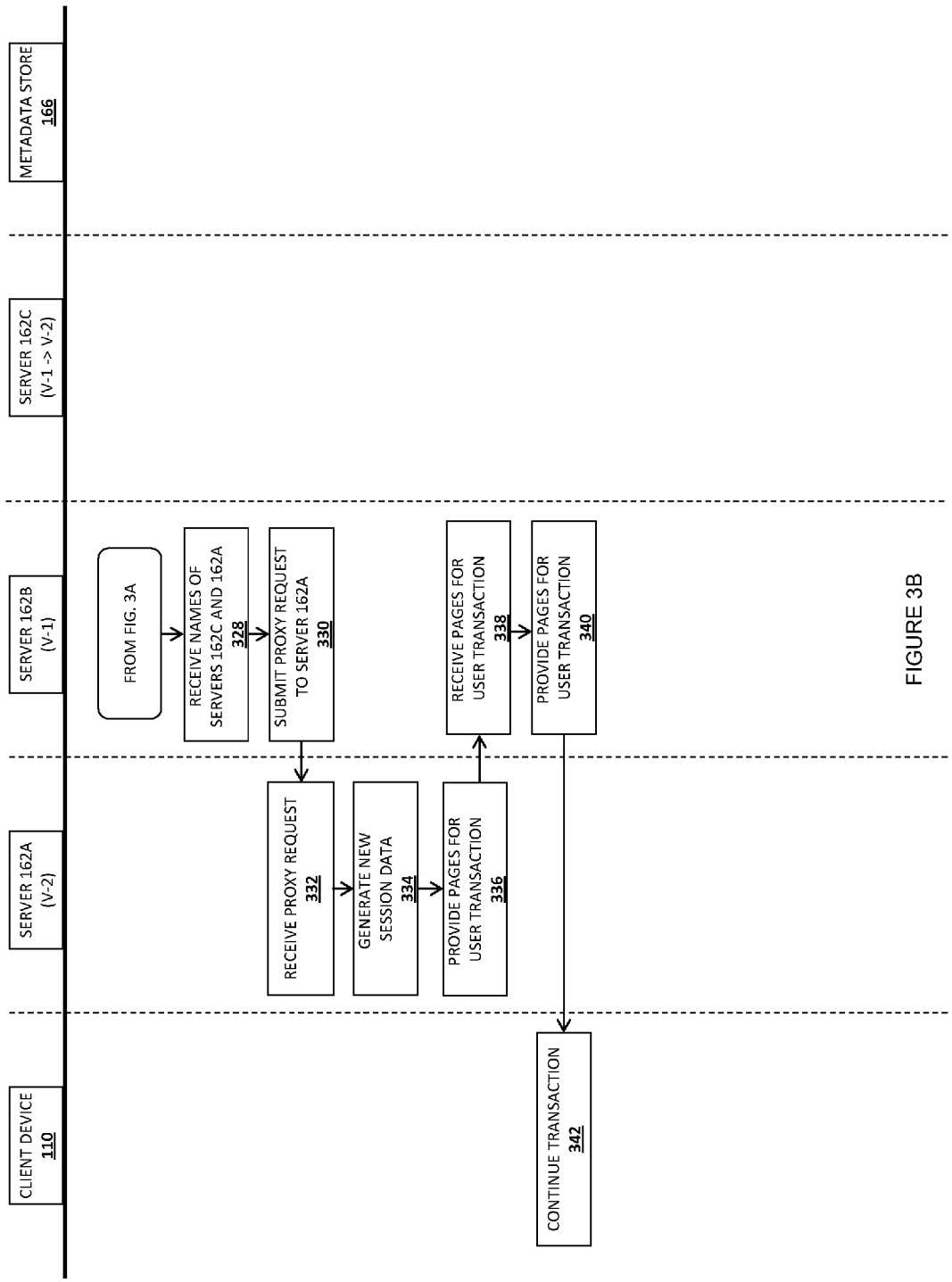

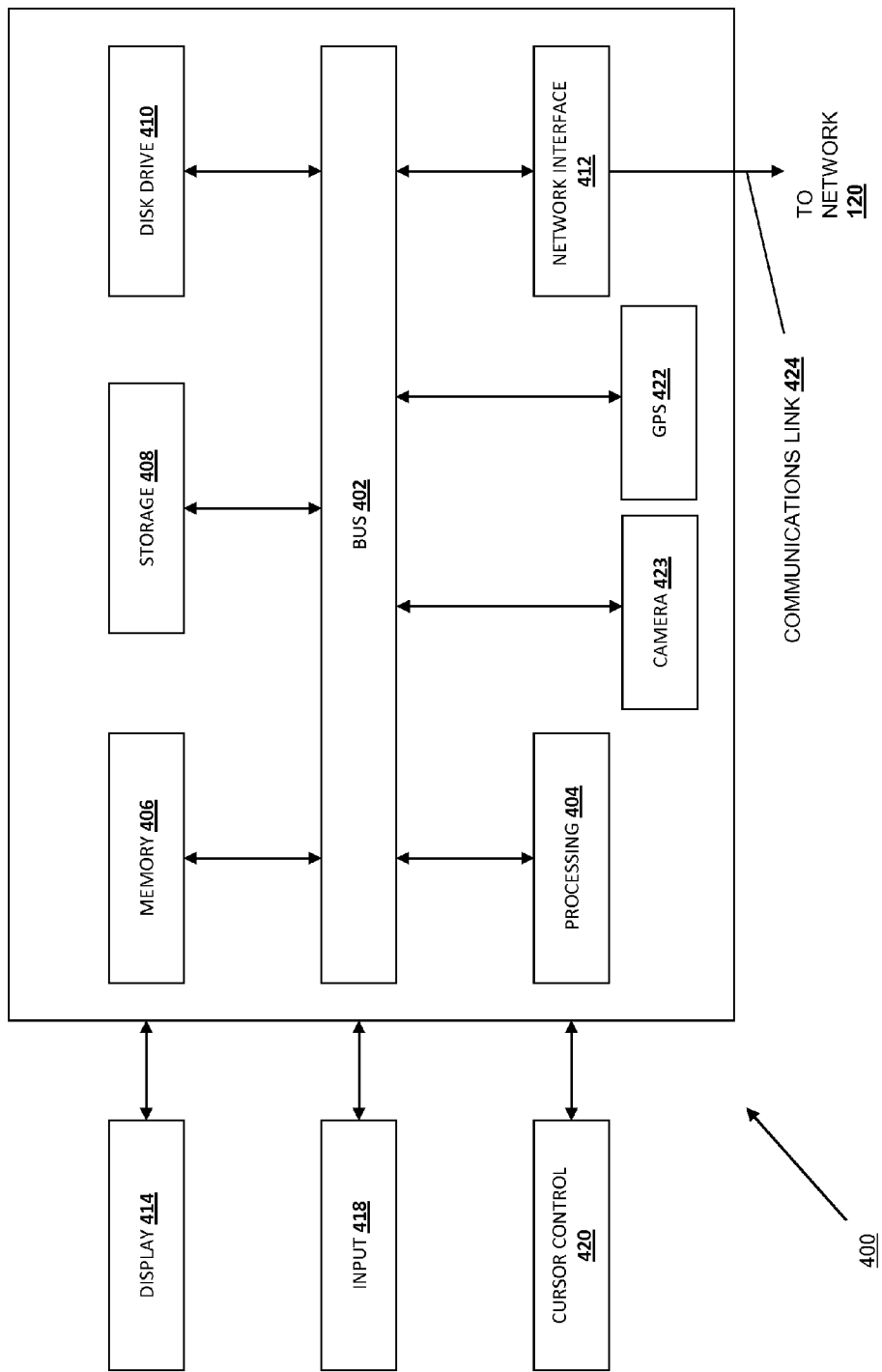

SESSION MANAGEMENT IN A MIXED MODE ENVIRONMENT

CROSS REFERENCE TO RELATED APPLICATIONS

The present application is related to U.S. patent application Ser. No. 14/266,463, filed Apr. 30, 2014, titled "MIXED MODE SESSION MANAGEMENT", which is herein incorporated by reference.

BACKGROUND

Field of the Invention

The present disclosure generally relates to applications executing on servers, and more particularly to a method and system for managing session creation within a server pool having servers executing multiple versions of an application.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Transactions facilitated by a payment service provider may involve multiple steps or stages, where each step takes place on a separate web page. Each web page may be provided by a server executing an application corresponding to that transaction. For reliability, availability, and other considerations, many payment service providers use large numbers of servers in a server pool, and each web page provided as part of a transaction may be provided by a different server in the server pool executing the application. However, some payment service providers frequently upgrade the versions of applications executing on servers that facilitate the services of the payment provider. When a user's transaction with a payment service provider begins on a server executing an older version of an application, e.g., a version of an application that is scheduled to be obsolete or upgraded, and if the number of other servers in the server pool executing that older version is decreasing, users may experience delays in transaction processing for subsequent steps of the transaction.

Thus, there is a need for an improved method and system for managing multiple versions of applications in a server pool.

BRIEF DESCRIPTION OF THE FIGURES

FIG. 2 is a flow chart illustrating an embodiment of a method for managing two or more versions of an application executing on two or more servers.

FIGS. 3A-3B are swim lane diagrams illustrating an example of managing two or more versions of an application executing on two or more servers.

FIG. 4 is a schematic view illustrating an embodiment of a system provider device.

Figure 1:
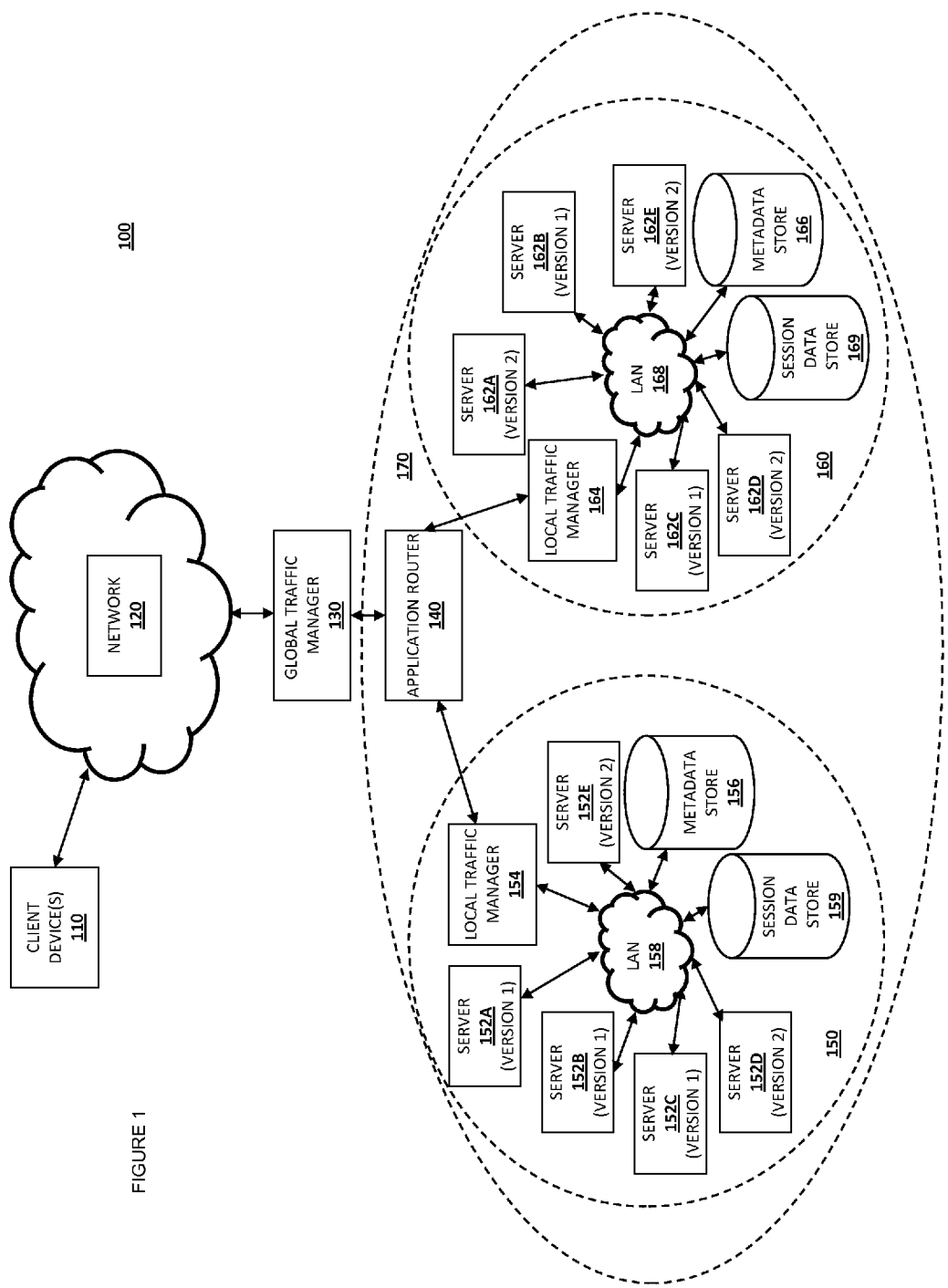
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for managing new session data in an environment with two or more versions of an application executing on two or more servers. The servers may be part of a server pool in which all servers in the server pool are executing the same application. Different servers in the server pool may be executing different versions of the application. The application may be provided by a payment service provider to facilitate a particular transaction, such as providing payment to purchase a product, or transferring funds from a sender to a recipient. A request to generate new session data for a transaction requested by a user may be received at a first server executing a first version of an application. The first server may determine that the first version of the application is unsuitable or otherwise not preferred to process the request to generate new session data for the transaction requested by the user. For example, the first server may determine, within a server pool having a plurality of servers that include the first server, that a number of other servers executing the first version of the application is decreasing and/or is below a threshold percentage. Such a situation may arise when the first version of the application is being upgraded to a newer version. In response, the first server may request, from a metadata store, an identity of a second server executing a second version of the application, different from the first version. The first server may receive the identity of the second server executing the second version of the application, and transmit a proxy request to the second server associated with the identity of the second server. Session data for the user's requested transaction may then be created or generated by the identified second server to begin the user's transaction with the second version of the application, as the result of the first server submitting a proxy request to the second server.

Referring now to FIG. 1, an embodiment of a networked system 100 is illustrated. The networked system 100 includes one or more client devices 110 that are coupled to a network 120. A global traffic manager 130 is coupled to the network 120 and to an application router 140. The application router 140 is coupled to one or more server pools 150 and 160. Each server pool 150 and 160 may include one or more servers (denoted as 152a-152e and 162a-162e) that are each coupled through a local network (e.g., a local area network (LAN)) 158 and 168, respectively, to a local traffic manager 154 and 164, respectively, a metadata store 156 and 166, respectively, and a session data store 159 and 169, respectively. Session data stores 159 and 169 may store session data for one or more transactions of a payment service provider, as will be described further below. Each of the local traffic managers 154 and 164 are coupled to the application router 140.

In the embodiments discussed below, each server pool may be used by a payment service provider to provide one or more payment service provider applications, such as a checkout application, money sending application, and/or other payment service provider applications known in the art. As such, the server pools 150 and 160 and the application router 140 may be part of a payment service provider system 170. Payment service provider system 170 may provide multiple applications to consumers and businesses that facilitate a wide variety of transactions. However, one of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any system provider utilizing the teachings of the present disclosure to manage two or more versions of any type of application executing on two or more servers is envisioned as falling within the scope of the present disclosure.

The client devices, global traffic manager, application router, servers, local traffic manager, and metadata store may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application.

The client devices 110 may further include other applications as may be desired in particular embodiments to provide desired features to the client devices 110. In particular, the other applications may include a payment application for payments facilitated by a payment service provider through the server pools 150 and 160. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number. In one embodiment, the user identifier may be used by the payment service provider server pools 150 and 160.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

The global traffic manager 130 may be provided by a third party service not affiliated with an individual user, and may be used by many parties, including payment service providers, to direct user requests to servers or other computing resources that are located geographically closer to a particular user or computing resources that have capacity to handle user requests.

The application router 140 may be part of a payment provider service system 170, and may receive user requests and facilitate transactions with users by directing requests, data for transactions, and any other data to an appropriate server pool or individual server executing a particular application. For example, application router 140 may direct a request for a checkout application to a server pool having servers executing the checkout application.

As described above, server pools 150 and 160 may include a plurality of servers 152a-152e and 162a-162e, local traffic managers 154 and 164, and metadata stores 156 and 166. As illustrated in FIG. 1, different servers in the server pools 150 and 160 (e.g., servers 152a-152e and 162a-162e) may be executing a different version of a particular application (e.g., version 1 or version 2 in the illustrated embodiment). Examples of applications include, for example, a purchasing application for purchasing a good or service from a merchant (e.g., a checkout application), a money sending application for sending money from one person or entity to another, a donation application for donating money from a person or entity to a charity, or any other application provided by a payment service provider. Furthermore, as discussed above, a wide variety of applications other than payment applications will benefit from the teachings of the present disclosure and are envisioned as falling within its scope. For example, in FIG. 1, servers 152a, 152b, and 152c are executing version 1 of a money sending application, while servers 152d and 152e are executing version 2 of that money sending application. Similarly, servers 162b and 162c are executing version 1 of a money sending application, while servers 162a, 162d, and 162e are executing version 2 of the money sending application. Although two versions are illustrated in FIG. 1, embodiments described herein may include servers in one or more server pools executed any number of versions of an application. Further, the version of an application executing on any particular server may change if a new version of the application is installed on that server. Thus, for example, server 152a or 162a may be upgraded to version 2 of the application at some point in the future.

Local traffic managers 154 and 164 may receive requests from the application router 140, and may select a server in their respective server pool that will handle the requests. The server selected to handle a request may be chosen by taking into consideration multiple factors such as, for example, a current workload of the servers in the server pool and/or a variety of other request handling criteria known in the art.

The example applications described above may require multiple steps or stages, each of which may presented to a user using one or more web pages having input fields and/or other data, to perform a transaction. In an embodiment, each web page that is presented to the user and that corresponds to a step to perform the transaction may be provided by a different server in a server pool. For example, a first web page corresponding to a first step of a money sending transaction may be provided by server 152a, a second web page corresponding to a second step of the money sending transaction may be provided by server 152b, and a third web page corresponding to a third step of the money sending transaction may be provided by server 152c. Data spanning across multiple user requests for a single transaction may be referred to as session data, and contains an accumulation of data transmitted between a client device 110 and one or more servers 152 and 162 during multiple HTTP requests pertaining to a single transaction. Session data may be stored in, for example, a session data store 159 or 169. Session data may be generated by a server which receives the initial request from the user, and may be associated with the version of the application executing on the server which receives the request.

Thus, in a typical user transaction, the user's session data is initialized, generated, or created while processing a request submitted at client device 110, which may be routed to the application router 140 by the global traffic manager 130. As described above, the global traffic manager 130 may be used by the payment service provider to direct user requests to server pools that are located geographically closer to a particular user. From global traffic manager 130, the user's request then passes to application router 140, which determines the application suitable for the user's transaction and forwards the user's request to a server pool (such as server pool 150 or 160) with servers executing the appropriate application. The local traffic manager 154 or 164 of the server pool then forwards the user's request to one of the servers 152a-152e or 162a-162e based on various criteria, such as a current workload of each server. The selected server then facilitates the user's request, generating session data and storing information about the transaction into a persistent session store, such as session data store 159 or 169, holding the session data across multiple requests within the transaction. Session data is typically a list or a set of key/value pairs, where each pair stores data used by the transaction.

Payment service providers often use multiple servers executing the same application to provide high availability of the application. For example, applications used by payment service providers that facilitate purchases or other transactions are desired to provide near 100% availability in order to allow users to purchase products or perform other transactions at any time of the day or night. The multiple servers, which may constitute a server pool, may all execute the same application, and each server can handle one or more steps or stages of a transaction. Typically, only one version of an application is executing on servers in a server pool at a given time. However, there are certain times when two or more versions of an application may execute on servers in a server pool at a given time. For example, during deployment of a new version of an application, two versions of an application may be executing on servers in a server pool at the same time. Upgrading an application executing on a server to a new version may be difficult when applications require such high availability. Further complications may arise during the upgrade process on multiple servers when two different versions of an application are incompatible with each other.

For example, version 1 of a particular application may require three steps or stages, and version 2 of that application may require four stages. Elements of session data that are used by the application may differ from version 1 to version 2. As one example, a money sending application may allow a first user to send money to a second user. Version 1 of the money sending application may include three steps: (1) specify the recipient, (2) specify the amount and source of funds, and (3) confirm the transfer. Thus, the session data for version 1 of the money sending application may include key/value pairs for at least the recipient, amount, and source information. Version 2 of the money sending application may include four steps: (1) specify the recipient, (2) specify the date of transfer, (3) specify the amount and source of funds, and (4) confirm the transfer. Thus, session data for version 2 of the money sending application may include at least the recipient, date of transfer, amount, and source information.

If the user's session begins on a server in a server pool executing version 2 of the money sending application, and at some point in the transaction, the session is transferred to a server in the server pool executing version 1 of the money sending application, an error may occur. The error may occur in the above example because version 2 of the money sending application requires the user to specify the date of transfer, and such data may be provided by the customer and included in the session data, but version 1 of the application does not or cannot read, process, or otherwise handle that session data containing the date of transfer information. Such an error may be referred to as a deserialization exception. That is, the earlier version of the application cannot or does not know how to process session data it does not expect to see, because the new version of the application includes a new variable or may include a new class. Typically, when such a deserialization exception occurs, the user is presented with an error, the user's attempted transaction fails, and the user must restart the transaction from the beginning.

In the converse of the above example, the user's session may begin on a server executing version 1 of the money sending application, and at some point in the transaction, the session may be transferred to a server executing version 2 of the money sending application, and thus an error may occur in this situation as well. For example, the server executing version 2 of the money sending application will expect to see date of transfer information in the session data. However, because such data is not required by version 1 of the application, that data will not be included in session data provided to the server executing version 2 of the money sending application when the user session is transferred from that server from the server executing version 1 of the money sending application. Thus, a deserialization exception may occur in this example as well.

When upgrading multiple servers to execute a new version of an application, one option is to deactivate multiple servers at the same time, install the new version of the application, and reactivate the servers once the upgrade is complete on all servers. For example, to upgrade servers 162a-162e, every one of those servers may be taken offline or deactivated at the same time, have version 2 of an application installed, and then be reactivated. Deactivating servers and upgrading the applications on those servers helps ensure that deserialization exceptions and other related errors do not occur. However, deactivating multiple servers at once may affect availability of the application executing on the servers, and may lead to a diminished user experience.

Instead of deactivating groups or pools of servers at the same time, applications may be upgraded on individual servers in a server pool one at a time or in groups smaller than the total number of servers in the server pool. Such an upgrade strategy minimizes the unavailability of the application. Since only a portion of the servers in the server pool are deactivated at a time, the other servers in the server pool can handle user requests without a large impact on application availability. Such an upgrade strategy may be known as a mixed mode deployment strategy. A mixed mode deployment strategy may also be used when testing a new version of an application on a limited number of servers in a server pool. However, using such an upgrade strategy, deserialization exceptions may occur when the different servers in the server pool have different application versions, as a user's session can span multiple servers having different versions and lead to the problems discussed above.

Further, when utilizing a mixed mode deployment strategy, deserialization exceptions may become more frequent, as session data may be generated by servers executing unsuitable or obsolete versions of applications. For example, as individual servers in a server pool are being upgraded from version 1 of an application to version 2 of the application, session data may still be generated for initial requests from users on those servers executing version 1 of the application. As the upgrade process continues, the number of servers in the server pool executing version 1 of the application may decrease, which may correspondingly increase the number of deserialization exceptions that occur.

For example, if a server pool has 12 servers, and 3 servers are upgraded at a time, at some point in the upgrade process, 75% of the servers in the server pool will be executing the newer version of the application. Transactions which begin on servers executing the older version of the application will generate session data associated with the older version of the application. Subsequent steps of that transaction, however, have a high probability of being routed to servers executing the newer version of the application, which will result in deserialization exceptions. As the population of servers in the server pool executing the older version of the application decreases, limiting or eliminating the amount of generated session data associated with the older version of the application will reduce the number of deserialization exceptions that occur.

One solution to the issues raised by a mixed mode deployment strategy is to utilize intelligent routing. That is, a load balancer or other front end router, such as local traffic manager 154 or application router 140, may be configured to direct requests from a user to perform a transaction to an appropriate server executing an application version. Thus, in the example above, local traffic manager 154 may route requests for transactions from users to only those servers in a server pool executing a newer or upgraded version of an application, instead of the servers in the server pool executing an unsuitable or obsolete version which is being upgraded. Thus, new session data is only generated by servers executing the newer version of the application. However, intelligent routing may slow the performance of the router, load balancer, and/or other front end systems. Further, intelligent routing may only be necessary when an application is being upgraded in the mixed mode deployment strategy, and such upgrade events or roll-outs may be infrequent. Additionally, even when an application is being upgraded, session deserialization exceptions themselves may occur infrequently. Thus, the decrease in performance resulting from intelligent routing may not be commensurate with the benefit afforded by intelligent routing.

Embodiments described herein utilize additional features that may be executed as part of an application itself to minimize or eliminate the amount of new session data created by older versions of an application executed by servers in a server pool. Instead of creating session data on a server executing a version of an application that is being upgraded, the user's transaction request may be transmitted via a proxy request from the server which receives the initial request to a server executing the upgraded version of the application, such that the server executing the upgraded version of the application generates the user's session data. Accordingly, the user's experience is improved. In one embodiment, a metadata store, such as metadata store 156 or 166, maintains information describing the versions of an application executing on various servers in a server pool. Each server in the server pool may maintain and periodically update statistics relating to the number or proportion of other servers in the server pool executing the same version of the application as the server itself. If a given server determines that a number of application servers executing its own version of the application is decreasing, or below a given threshold, the server may consult the metadata store to identify another server executing the upgraded version of the application, and transmit a proxy request to that server in the server pool executing the upgraded version of the application. Thus, the user's session is created with the upgraded version of the application, and deserialization exceptions are minimized.

Referring now to FIG. 2, an embodiment of a method 200 for managing two or more versions of an application executing on two or more servers is illustrated. In the embodiments and examples discussed below, a money sending application is used as an example of a payment application. However, other payment applications are also possible, including checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require high availability (e.g., a stock trading or other financial services application).

The method 200 begins at block 202 where a hypertext transmission protocol request from a user is received at a first server executing a first version of an application. In one embodiment, the request is for an initial or first step of a transaction that generates new session data for the user's transaction. For example, as described above, the request may be received at server 162b from a client device 110 through a global traffic manager 130, application router 140, and local traffic manager 164.

The method 200 then continues to block 204, where the first server determines that the first version of the application is unsuitable to process the request and to generate session data associated with the first version of the application. The first version of the application may be unsuitable to process the request and generate session data associated with the first version of the application because, for example, the number of other servers within a server pool including the first server that are also executing the first version of the application is decreasing or is below a given threshold. For example, in one embodiment, the application maintains statistics as to the number or proportion of servers in a server pool executing the same version of the application. If the proportion of servers in the server pool executing the first version of the application was previously 60%, and has dropped to 40%, a server may determine that it is in a shrinking proportion of servers executing the first version of the application, and accordingly, the server may determine that the first version of the application is unsuitable to process the request and generate session data for the user's transaction. As discussed above, the determination may also be based on a threshold percentage, such as 50%, although other thresholds are possible. Similarly, if the number of servers in the server pool executing the first version of the application was previously 6, and has dropped to 4, a server may determine that it is in a shrinking number of servers executing the first version of the application, and accordingly, the server may determine that the first version of the application is unsuitable to process the request and generate session data for the user's transaction. Again, the determination may also be based on a threshold number of servers, such as 5, although other thresholds are possible.

In one embodiment, the statistics are based on data periodically retrieved from a metadata store, such as metadata store 166. Metadata stores may store, for each server in a server pool, a record that identifies a location of the server, an application name of an application executing on the server, a version number or build number of that application, and the last time the record was updated. The data in the metadata store may be updated when an application is started on the server. Similarly, when the application is shut down, the record for the server may be deleted from the metadata store. On a periodic basis, each server in the server pool may update its metadata store record. For example, each server may update its corresponding metadata store record every 15 minutes. The update interval may be configurable depending on the payment service provider's or system provider's needs, based on the application being executed by the servers in the server pool, and/or based on a variety of other update factors known in the art. In one embodiment, the data for maintaining statistics may be retrieved from the metadata store whenever the metadata store is updated by another server in the server pool.

In one embodiment, when the metadata store is queried, records for servers having a last update time that exceed a threshold (i.e., records older than the update interval of 15 minutes, 60 minutes, and/or other thresholds known in the art) may be removed from the metadata store. Such records may be referred to as "stale metadata." Thus, for example, servers that crash or otherwise become unresponsive may have their associated metadata removed from the metadata store. The stale metadata interval may be configurable depending on the payment service provider's or system provider's needs, or based on the application being executing by the servers in the server pool, and/or based on a variety of other stale metadata factors known in the art.

Based on the determination at block 204, the method 200 then continues to block 206, where the first server (e.g., server 162*b*) requests the identity of a second server in the server pool that is executing a second version of the application. In one embodiment, for example, server 162*b* may consult or query a metadata store, such as metadata store 166, to identify one or more servers in the server pool that are executing a second version of the application that is a newer or upgraded version of the application executing on the first server.

The method 200 then continues to block 208, where the first server (e.g., server 162*b*) selects one of the one or more servers executing the second version of the application to process the request to generate new session data. For example, server 162*b* may select server 162*e*, executing version 2 of the application. In some embodiments, the identity of more than one server executing the second version of the application may be received based on the request of block 206. Accordingly, in one embodiment, the first server may select one of the servers at block 208 on a random basis. In one embodiment, the selection at block 208 may be based on a last update time of the metadata store record for that server. Thus, for example, servers that have more recently updated records in the metadata store may be chosen over servers with older records in the metadata store.

As explained above, in one embodiment, the second version of the application is a newer version or upgraded version of the application. The determination of a newer version may be based on, for example, a version number, build number, time value, or any other data associated with a record in the metadata store. In one embodiment, if more than two versions of the application are executing on servers within the server pool, the selected server may be a server executing the version of the application most prevalent in the server pool. For example, if a server pool has 12 servers, with 3 servers executing version 1 of an application, 6 servers executing version 2 of the application, and 3 servers executing version 3 of the application, a server executing version 2 of the application may be selected. Further, in one embodiment, if more than two version of the application are executing on servers within the server pool, the selected server may be the server executing the version of the application with an increasing population within the server pool.

The method 200 then continues to block 210. At block 210, the request may be proxied to the server executing the second version of the application identified at block 208. In one embodiment, a hypertext transfer protocol proxy forward request is used to transmit the request from the server that initially received the request at block 202 to the server determined to have the second version of the application at block 208. The proxy request may submit a new GET or POST HTTP request to the server executing the second version of the application. The server executing the second version of the application may then generate the user's session data, which is then associated with the second version of the application. Further processing of the session data on other servers in the server pool executing the second version of the application therefore occurs without deserialization exceptions or other errors.

In certain cases, at block 210, the proxy request to the selected server may fail. This can occur, for example, if the selected server crashed in the time period between when it updated its metadata store record and the time when the metadata store was queried in block 206. Thus, in one embodiment, if the proxy request fails, the metadata store may be queried to identify another server in the server pool to which the proxy request can be transmitted in substantially the same manner as discussed above with reference to blocks 206 and 208. In one embodiment, the receiving server may query the metadata store following proxy request fails for multiple servers until a threshold number of servers have been attempted, or until a specified time period has passed. For example, the receiving server may query the metadata store following proxy request fails until up to 5 servers have been returned, or may continue querying the metadata store following proxy request fails until 30 seconds or another time period has elapsed. If the threshold number of servers has been attempted or the time period has passed, an error may be returned to the user, and the transaction may fail.

Figure 3A:
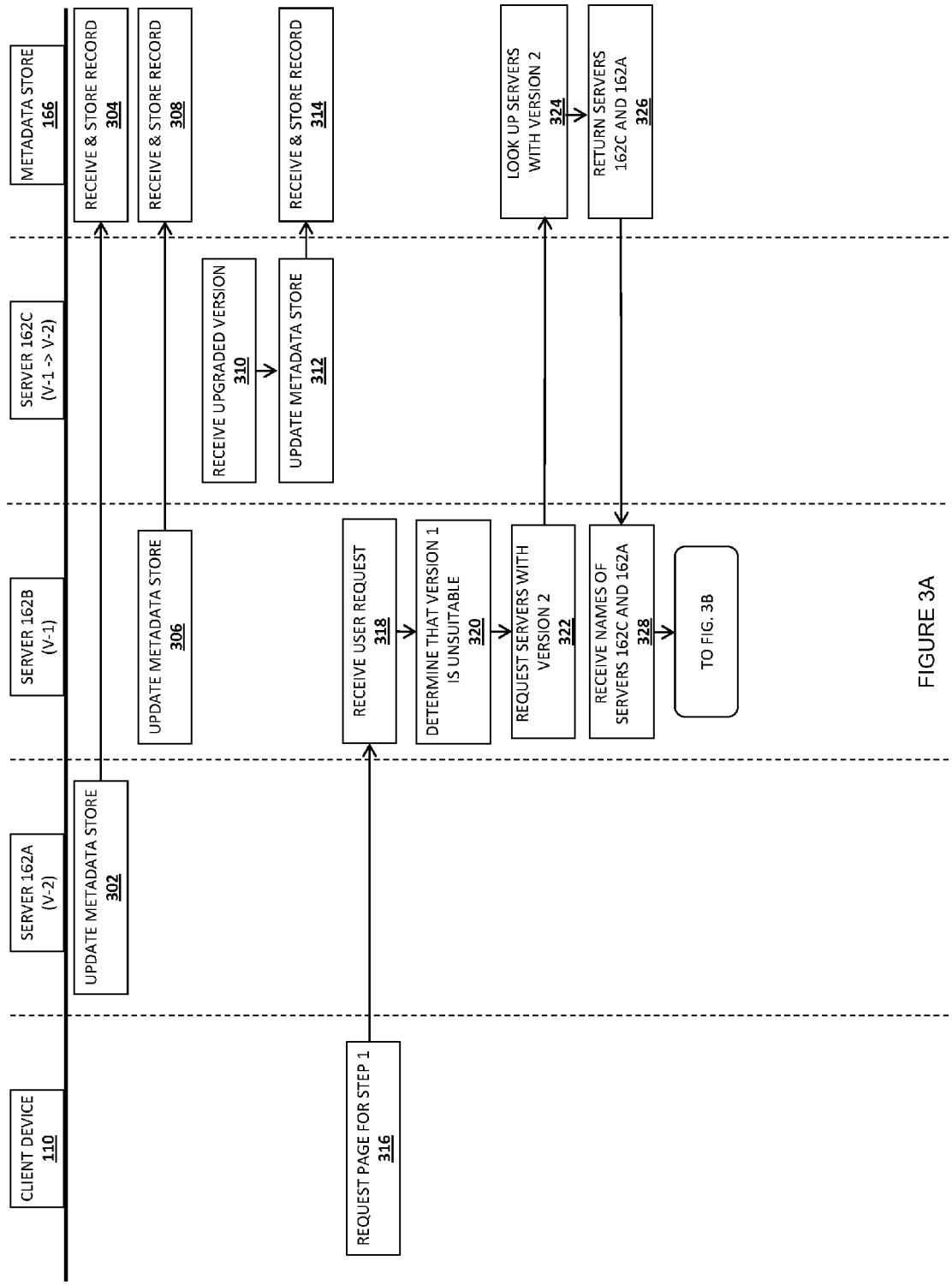

Referring now to FIGS. 3A and 3B, a swim lane diagram (which begins at FIG. 3A and continues to FIG. 3B) detailing the interaction between various systems and components described with reference to embodiments discussed above is illustrated. The example of FIGS. 3A-3B illustrates the interactions between a client device 110, servers 162a, 162b, 162c, and metadata store 166. In the example of FIG. 3, server 162a is executing version 2 (denoted as V-2) of an application and server 162b is executing version 1 (denoted as V-1) of the application. Further, in the example of FIGS. 3A-3B, server 162c is initially executing version 1 of the application, but is later updated to version 2 of the application. In FIGS. 3A-3B, a checkout application is illustrated, but the illustration is equally applicable to other types of applications.

Beginning on FIG. 3A, at event 302, server 162a may begin executing version 2 of the checkout application. Accordingly, server 162a may update the metadata store 166 with a record identifying the application being executed, the version number of the application, and the time the metadata store 166 was updated. At event 304, the metadata store may receive and store the record.

At event 306, server 162b may begin executing version 1 of the checkout application. Accordingly, server 162b may update the metadata store 166 with a record identifying the application being executed, the version number of the application, and the time the metadata store 166 was updated. Further, at event 308, the metadata store may receive and store the record.

At event 310, server 162c (which may have already been executing version 1 of the checkout application) is upgraded to version 2 of the checkout application. Thus, at event 312, server 162c transmits an updated record to metadata store 166 updating at least the version number of its metadata record and the last update time. At event 314, the metadata store 166 may receive and store the record.

At event 316, a user using client device 110 may commence a checkout application transaction. At event 318, server 162b may receive the user's request for the transaction. At event 320, server 162b may determine that version 1 of the application is unsuitable to process and generate session data for the user's requested transaction. As explained above with reference to block 204 of the method 200, server 162b may make this determination based on statistics reflecting the fact that the number of servers within the server pool executing version 1 of the application is decreasing.

Based on the determination, at event 322, server 162b, as discussed above with reference to block 206 of the method 200, may submit a lookup request to metadata store 166 for a server executing a newer version of the application. At event 324, metadata store 166 receives the request from server 162b and may determine from the records in the metadata store any servers in the server pool executing a newer version of the application, i.e. version 2 of the application, such as server 162a and 162c. At event 326, metadata store 166 may transmit the identified servers to server 162b.

At event 328, server 162b receives the data indicating that servers 162a and 162c are executing version 2 of the application. Continuing to FIG. 3B, server 162b may choose server 162a to handle the request and generate new session data for the user's transaction (for example, on a random basis), and thus, at event 330, server 162b submits a proxy request to server 162a. At event 332, server 162a may receive the proxy request, and can then generate session data for the user's transaction at event 334. Server 162a may write the session data for the user's transaction to a session data store 169. Once server 162a generates the user's session data at event 334, server 162a may provide one or more web pages for the transaction to server 162b, which originally received the user's request, at step 336. Server 162b may receive the one or more pages at step 338, and provide those pages to the client device 110 at event 340. The user may then continue the transaction at event 342.

In the embodiments and examples described above, servers which can be candidates for proxy requests are restricted to those servers within the same server pool as a server receiving a request from a user. For example, metadata store 156 may only include application version information for servers within server pool 150. Additionally, session data store 159 may only store data for transactions which occur on servers within server pool 150. Thus, only servers within server pool 150 (for example, servers 152b and 152c) may serve as candidate servers for a proxy request from another server in server pool 150 (such as server 152a).

In one embodiment, data may be replicated between metadata store 156 and metadata store 166, and thus, servers in both server pool 150 and 160 may be candidate servers for proxy requests from servers in server pool 150 and 160. In one embodiment, session data may also be replicated between session data store 159 and 169. In a further embodiment, metadata stores 156 and 166 may be combined into a single metadata store accessible to both server pools 150 and 160. Similarly, session data stores 159 and 169 may be combined into a single session data store accessible to both server pools 150 and 160. In such embodiments, proxy requests may still be limited to servers within a same server pool, for example, using database lookup techniques.

In one embodiment, an application upgrade strategy or rollout strategy may minimize the number of deserialization exceptions that occur. Such a rollout strategy may upgrade servers to new application versions in groups. In one embodiment, a relatively small set of servers is upgraded, followed by one or more relatively larger sets of servers, and the rollout strategy may finish by upgrading one or two relatively smaller sets of servers. In one embodiment, a waiting period approximately equal to the longest expected reasonable session duration may be allowed between the upgrade of two server groups, to allow in-progress sessions time to finish. The total time to upgrade a server pool to a new version of an application may be minimized, since mixed mode management may increase the workloads of servers in the server pool.

Thus, systems and methods for managing multiple versions of an application on multiple servers have been described that provide for high availability of the application while minimizing the occurrence of errors that result from session data being created on servers in a server pool executing older or obsolete versions of applications. The systems and methods of the present disclosure provide substantial benefits over conventional solutions such as the intelligent routing solutions discussed above by, for example, causing session data to be generated on only servers executing versions of applications that are in an increasing population, rather than generating session data on servers executing all versions of an application, such that further processing of the session data can occur on a larger number of appropriate servers.

Referring now to FIG. 4, an embodiment of a computer system 400 suitable for implementing, for example, the client device 110, application router 140, servers 152a-e and 162a-e, local traffic manager 154 and 164, and/or metadata store 156 and 166, is illustrated. It should be appreciated that other devices utilized by customers, merchants, payment service providers, and/or system providers in the system discussed above may be implemented as the computer system 400 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the client devices 110, servers 152 and 162, application router 140, local traffic managers 154 and 164, and/or metadata stores 156 and 166. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An application version management system, comprising:
    an application server comprising a non-transitory memory and one or more hardware processors, wherein the non-transitory memory stores a first version of an application, and the one or more hardware processors are coupled to the memory and operable to read instructions from the memory to perform the steps of:
        receiving a request to generate new session data for a transaction requested by a user;

determining that the first version of the application is unsuitable to process the request to generate new session data for the transaction requested by the user;

determining an identity of a second server that is executing a second version of the application, the second version being different than the first version; and transmitting a proxy request to the second server associated with the identity of the second server.

2. The system of claim 1, wherein the step of determining that the first version of the application is unsuitable to process the request to generate a new session for the transaction by the user further includes:

determining, within in a server pool including the application server, that a number of application servers executing the first version of the application is decreasing; and determining, within the server pool including the application server, that a percentage of application servers executing the first version of the application is below a threshold.

3. The system of claim 1, wherein the step of determining an identity of a second server executing the second version of the application further includes:

querying, in response to the determination, a metadata store to identify one or more servers in a server pool that are executing the second version of the application; and receiving, in response to the query, the identity of the second server from a plurality of servers in the server pool that are executing the second version of the application.

4. The system of claim 3, wherein the one or more hardware processors are further operable to read instructions from the memory to perform the steps of:

determining an update time of metadata records in the metadata store corresponding to each of the plurality of servers in the server pool, wherein the identity of the second server is determined based on the update time of the metadata record for the second server being of a sufficient recentness.

5. The system of claim 3, wherein the step of querying a metadata store to identify one or more servers in a server pool that are executing the second version of the application further includes determining that a percentage of application servers in the server pool that are executing the second version of the application is above a threshold.

6. The system of claim 1, wherein the one or more hardware processors are further operable to read instructions from the memory to perform the step of maintaining statistics comprising at least a number of application servers within a server pool including the application server executing the first version of the application.

7. The system of claim 1, wherein transmitting the proxy request to the second server associated with the second server identity causes new session data to be generated by the second server associated with the second server identity.

8. The system of claim 1, wherein the step of determining an identity of a second server that is executing a second version of the application, the second version being different than the first version further includes:

requesting an identity of a second server that is executing a second version of the application, the second version being different than the first version; and receiving the identity of the second server that is executing the second version of the application.

9. A method for managing multiple versions of applications, comprising:

receiving, at a first server executing a first version of an application, a request to generate new session data for a transaction requested by a user;

determining, by the first server, that the first version of the application is unsuitable to process the request to generate new session data for the transaction requested by the user;

determining, by the first server, an identity of a second server that is executing a second version of the application, the second version being different than the first version; and transmitting, by the first server, a hypertext transfer protocol proxy request to a second server associated with the second server identity.

10. The method of claim 9, further comprising:

determining, by the first server and within a server pool including the first server, that a number of application servers executing the first version of the application is decreasing; and determining, by the first server and within the server pool including the first server, that a percentage of application servers executing the first version of the application is below a threshold.

11. The method of claim 9, further comprising:

querying, by the first server and in response to the determination, a metadata store to identify one or more servers in a server pool that are executing the second version of the application; and determining, in response to the query, the identity of the second server from a plurality of servers in the server pool that are executing the second version of the application.

12. The method of claim 11, wherein the identity of the second server is determined based on a random selection from the plurality of servers in the server pool.

13. The method of claim 11, further comprising:

determining, by the first server, an update time of metadata records in the metadata store corresponding to each of the plurality of servers in the server pool, wherein the second server is determined based on the update time of the metadata record for the second server being of a sufficient recentness.

14. The method of claim 11, wherein querying a metadata store to identify one or more servers in a server pool that are executing the second version of the application further includes determining that a percentage of application servers in the server pool that are executing the second version of the application is above a threshold.

15. The method of claim 9, further comprising maintaining, by the first server, statistics comprising at least a number of application servers within a server pool including the first server executing the first version of the application.

16. The method of claim 9, wherein transmitting, by the first server, the hypertext transfer protocol proxy request to the second server associated with the second server identity causes new session data to be generated by the second server associated with the second server identity.

17. The method of claim 9, wherein determining, by the first server an identity of a second server that is executing a second version of the application, the second version being different than the first version further comprises:

requesting, by the first server, an identity of a second server that is executing a second version of the application, the second version being different than the first version; and receiving, by the first server, the identity of the second server that is executing the second version of the application.

18. A non-transitory machine-readable medium comprising a plurality of machine-readable instructions which, when executed by one or more processors, are adapted to cause the one or more processors to perform a method comprising:

receiving, at a first server executing a first version of an application, a request to generate new session data for a transaction requested by a user;

determining, by the first server, that the first version of the application is unsuitable to process the request to generate new session data for the transaction requested by the user;

requesting, by the first server an identity of a second server that is executing a second version of the application, the second version being different than the first version;

receiving, by the first server, the identity of the second server that is executing the second version of the application; and transmitting, by the first server, a hypertext transfer protocol proxy request to a second server associated with the second server identity.

19. The non-transitory machine-readable medium of claim 18, wherein the method further comprises:

determining, by the first server and within a server pool including the first server, that a number of application servers executing the first version of the application is decreasing; and determining, by the first server and within the server pool including the first server, that a percentage of application servers executing the first version of the application is below a threshold.

20. The non-transitory machine-readable medium of claim 18, wherein the method further comprises:

querying, by the first server and in response to the determination, a metadata store to identify one or more servers in a server pool that are executing the second version of the application; and receiving, in response to the query, the identity of the second server from a plurality of servers in the server pool that are executing the second version of the application.

* * * * *